(12) United States Patent
Kim et al.

(10) Patent No.: US 12,122,340 B2
(45) Date of Patent: Oct. 22, 2024

(54) METHOD AND APPARATUS FOR ASSISTING CAMERA-BASED BCA

(71) Applicant: HYUNDAI MOBIS CO., LTD., Seoul (KR)

(72) Inventors: Minseok Kim, Seosan-si (KR); Taemin Kwon, Seosan-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 272 days.

(21) Appl. No.: 17/945,363

(22) Filed: Sep. 15, 2022

(65) Prior Publication Data

US 2023/0101538 A1 Mar. 30, 2023

(30) Foreign Application Priority Data

Sep. 27, 2021 (KR) .................. 10-2021-0126989

(51) Int. Cl.
| | |
|---|---|
| *B60T 7/22* | (2006.01) |
| *B60Q 9/00* | (2006.01) |
| *G01S 13/72* | (2006.01) |
| *G01S 13/86* | (2006.01) |
| *G01S 13/931* | (2020.01) |

(Continued)

(52) U.S. Cl.
CPC .............. *B60T 7/22* (2013.01); *B60Q 9/008* (2013.01); *G01S 13/72* (2013.01); *G01S 13/867* (2013.01); *G01S 13/931* (2013.01); *G06T 7/70* (2017.01); *G08G 1/167* (2013.01); *G01S 2013/9315* (2020.01); *G06T 2207/30261* (2013.01)

(58) Field of Classification Search
CPC ... B60T 7/22; B60T 7/70; B60Q 9/008; G01S 13/72; G01S 13/867; G01S 13/931; G01S 2013/9315; G01S 2013/93274; G08G 1/167; G06T 2207/30261; B60W 30/08; B60W 10/18; B60W 40/02; B60W 40/10; B60W 50/14; B60W 2050/143; B60W 2420/403; B60W 2420/408; B60W 2520/10; B60W 2540/18; B60W 2554/20
USPC ......................................................... 701/70
See application file for complete search history.

(56) References Cited

FOREIGN PATENT DOCUMENTS

| CN | 113696907 | * 11/2021 | ............ B60W 40/10 |
|---|---|---|---|
| CN | 111427041 | * 12/2021 | ............... G08G 1/04 |

(Continued)

*Primary Examiner* — Hai H Huynh
(74) *Attorney, Agent, or Firm* — NSIP Law

(57) ABSTRACT

Disclosed is a control assistance device that includes a radar system that detects surrounding objects, and generates radar tracking information tracking a position of the surrounding object relative to a vehicle, and a camera system, that includes cameras, and generates image information, and camera tracking information tracking the position of the surrounding object. The control assistance device also includes processors that determine whether the radar tracking information is generated in real time when the surrounding object approaches within a preset distance from the vehicle based on generated tracking information that includes the radar tracking information or the camera tracking information, determine whether the camera tracking information is generated in real time, when the radar tracking information is determined as generated in real time, and control a braking system of the vehicle based on the generated tracking information, when the camera tracking information is determined as generated in real time.

18 Claims, 6 Drawing Sheets

(51) Int. Cl.
*G06T 7/70* (2017.01)
*G08G 1/16* (2006.01)

(56) References Cited

FOREIGN PATENT DOCUMENTS

| CN | 116142171 | * | 5/2023 | .......... B60W 40/104 |
| JP | 2021503085 | * | 2/2021 | ........... G01S 7/4876 |

* cited by examiner

METHOD AND APPARATUS FOR ASSISTING CAMERA-BASED BCA

CROSS-REFERENCE TO RELATED APPLICATIONS

This application claims the benefit under 35 USC § 119(a) of Korean Patent Application No. 10-2021-0126989, filed on Sep. 27, 2021, in the Korean Intellectual Property Office, the entire disclosure of which is incorporated herein by reference for all purposes.

BACKGROUND

1. Field

The present disclosure relates to an apparatus and method for assisting a camera-based Blind-spot Collision Avoidance (BCA).

2. Description of Related Art

The content described in this section merely provides the background information on the present disclosure and does not constitute prior art.

A vehicle has an Advanced Driver Assistance System (ADAS). The vehicle analyzes a driver's condition and surrounding conditions, secures a clear view, displays a screen, and performs warning and control, using the ADAS. One of the functions of the ADAS includes Blind-spot Collision Avoidance (BCA). The BCA is the function of preventing collision with a surrounding object located in a blind spot of the vehicle when the vehicle changes a lane. The BCA detects the surrounding object using Radio Detection And Ranging (RADAR) mounted on the vehicle. If it is determined that there is a risk of collision between the detected surrounding object and the vehicle, the BCA controls the braking system of the vehicle.

The radar has a long but narrow detection range. When an object located close to the vehicle moves at low speed or stops, the radar mounted on the vehicle may not detect the surrounding object. In this case, there is a problem that the BCA does not operate.

When the surrounding object deviates from a zone where there is a risk of colliding with the vehicle, and the BCA may malfunction based on information detected by the radar while the surrounding object moves in this zone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a control assistance device that includes a radar system that includes a radar receiver that detects a surrounding object based on one or more radar signals, and generates radar tracking information tracking a position of the surrounding object relative to a vehicle, and a camera system, that includes one or more cameras, generates image information and camera tracking information tracking the position of the surrounding object relative to the vehicle based on the image information. The control assistance device also includes processors that determine whether the radar tracking information is generated in real time, when the surrounding object is determined to be approaching within a preset distance from the vehicle based on generated tracking information that includes one or more of the radar tracking information and the camera tracking information, determine whether the camera tracking information is generated in real time, when the surrounding object is determined to be approaching within a preset distance from the vehicle based on generated tracking information that includes at least one of the radar tracking information or the camera tracking information, determine whether the camera tracking information is generated in real time, when a result of the determining of whether the radar tracking information is generated in real time is that the radar tracking information is generated in real time, and control a braking system of the vehicle based on the generated tracking information, when a result of the determining of whether the camera tracking information is generated in real time is that the camera tracking information is generated in real time.

The processors may perform the determining of whether the surrounding object is approaching within the preset distance from the vehicle.

The processors may perform at least one of the determining of whether radar tracking information is generated in real time, or the determining of whether the camera tracking information is generated in real time.

The processors may delete the at least one of the radar tracking information or the camera tracking information from the generated tracking information in response to a determination that the radar tracking information is generated in real time, and in response to a determination that the camera tracking information is not generated in real time.

The processors may receive the camera tracking information and control the braking system of the vehicle based on the camera tracking information when the result of the determining of whether the radar tracking information is generated in real time is that the radar tracking information is not generated in real time, and the result of the determining of whether the camera tracking information is generated in real time is that the camera tracking information is generated in real time.

The processors may determine whether to approach the vehicle, using the camera tracking information when the generated tracking information includes the radar tracking information and the camera tracking information.

The processors may include a controller that may include a collision risk determination system that receives ego-car information including at least one of a position, speed, and steering angle of the vehicle from the vehicle, and determines whether there is a risk of collision between the vehicle and the surrounding object, based on the generated tracking information and the ego-car information.

The control assistance device may also include a warning system that notifies a driver of the vehicle of collision risk warning and of braking control, when the braking system of the vehicle is controlled.

In one general aspect, here is provided a control assistance method that includes detecting a surrounding object using one or more radar signals, generating tracking information by performing at least one of generating radar tracking information, of the generated tracking information, tracking a position of a surrounding object, relative to a vehicle, detected based on one or more radar signals received by a radar system, and generating camera tracking information, of the generated tracking information, tracking the position of the surrounding object relative to the vehicle, using one or more cameras, determining whether the surrounding object approaches within a preset distance from the vehicle, based on the generated tracking information, determining whether the radar tracking information is generated in real time, when the radar tracking information is generated and when a result of the determining of whether the surrounding object approaches within the preset distance is that the surrounding object approaches within the preset distance, determining whether the camera tracking information is generated in real time, when the camera tracking information is generated and when a result of the determining of whether the radar tracking information is generated in real time is that the radar tracking information is generated in real time, and controlling a braking system of the vehicle based on the generated tracking information, when a result of the determining of whether the camera tracking information is generated in real time is that the camera tracking information is generated in real time.

The generated tracking information may include the radar tracking information and the camera tracking information, and the method may further include deleting at least one of the radar tracking information or the camera tracking information from the generated tracking information, when the result of the determining of whether the radar tracking information is generated in real time is that the radar tracking information is generated in real time, and the result of the determining of whether the camera tracking information is generated in real time is that the camera tracking information is not generated in real time.

The controlling of the braking system may further include controlling the braking system of the vehicle based on the camera tracking information when the result of the determining of whether the radar tracking information is generated in real time is that the radar tracking information is not generated in real time, and the result of the determining of whether the camera tracking information is generated in real time is that the camera tracking information is generated in real time.

The determining of whether the surrounding object approaches within the preset distance may further include determining whether to approach the vehicle, using the camera tracking information, when the generated tracking information includes the radar tracking information and the camera tracking information.

The controlling of the braking system may further include receiving ego-car information including at least one of a position, speed, and steering angle of the vehicle from the vehicle, and determining whether there is a risk of collision between the vehicle and the surrounding object, based on the generated tracking information and the ego-car information.

The control assistance method may further include a process of notifying a driver of the vehicle of collision risk warning and braking control, in the case of controlling the braking system of the vehicle.

In one general aspect, here is provided a control assistance device that includes a radar system including a radar receiver that receives one or more radar signals, for detecting a surrounding object based on the one or more radar signals, a camera system, including one or more cameras, that generates at least image information, for tracking the surrounding object based on the at least image information, and processors that control a braking system of the vehicle based on tracking information that includes at least one of radar tracking information or camera tracking information, when the surrounding object is determined to be approaching within a preset distance from the vehicle, the radar tracking information is determined to be generated in real time, and the camera tracking information is determined to be generated in real time. The radar tracking information is based on the one or more radar signals and tracks a position of the surrounding object relative to the vehicle, and the camera tracking information is based on the at least image information and tracks the position of the surrounding object relative to the vehicle.

The radar system may detect the surrounding object and generate the radar tracking information, and the camera system may generate the camera tracking information.

The processors may perform the determining of whether the surrounding object is approaching within the preset distance from the vehicle based on the tracking information.

The processors may perform at least one of the determining of whether radar tracking information is generated in real time, or the determining of whether the camera tracking information is generated in real time Other features and aspects will be apparent from the following detailed description, the drawings, and the claims.

Figure 1:
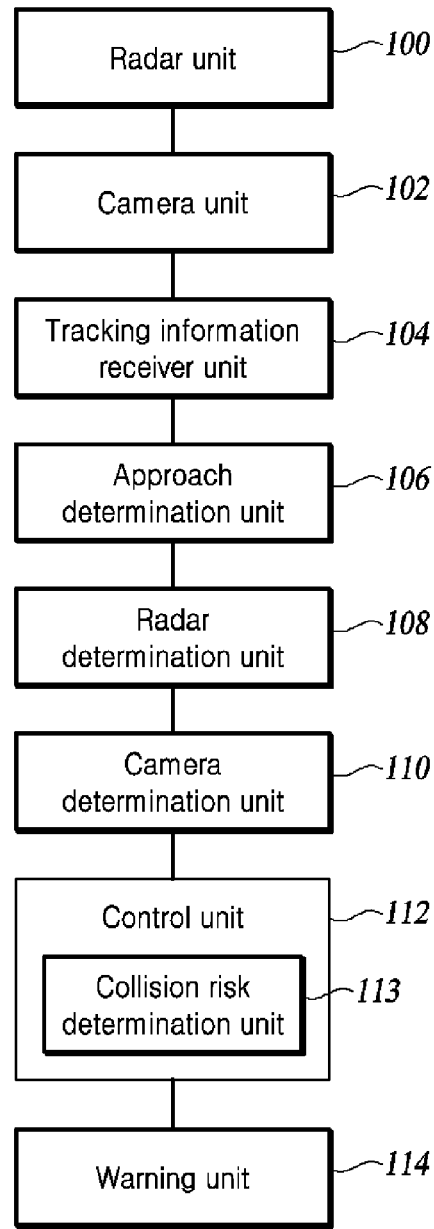
FIG. 1 is a block diagram illustrating the configuration of a control assistance device according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

FIG. 1 is a block diagram illustrating the configuration of a control assistance device according to an embodiment of the present disclosure.

Referring to FIG. 1, the control assistance device 10 includes all or some of a radar unit 100, a camera unit 102, a tracking information receiver unit 104, an approach determination unit 106, a radar determination unit 108, a camera determination unit 110, a control unit 112, and a warning unit 114.

The radar unit 100 detects a surrounding object of a vehicle using at least one radar. Here, the surrounding object includes people in the vicinity of the vehicle, other vehicles, road facilities, etc. When the surrounding object is detected, the radar unit 100 generates information (hereinafter referred to as "radar tracking information") containing contents tracking the position of the detected surrounding object relative to the vehicle. The radar tracking information includes a real-time position subsequent to a position of a moment when the surrounding object is first detected. Since it is possible to determine the speed and position of the surrounding object by tracking the moving position of the surrounding object, the control assistance device 10 may determine whether there is a risk of collision with the vehicle based on the radar tracking information. A radar sensor may be mounted on a front and/or a rear side of the vehicle. The radar sensor emits electromagnetic waves toward an object around the vehicle, and collects information about the surrounding object of the vehicle using a signal returned from the object.

The camera unit 102 recognizes whether an object is present in the vicinity of the vehicle using a camera. When the surrounding object is present, the camera unit 102 generates information (hereinafter referred to as "camera tracking information") containing contents tracking the position of the surrounding object relative to the vehicle. Information included in the camera tracking information is the same as the radar tracking information. The camera may be mounted on the front and/or the rear side of the vehicle. The camera mounted on the vehicle includes a front camera, a rear camera and/or an SVM camera. The SVM camera is a camera that is mounted on each of four directions of the vehicle. In the case of using the SVM camera, it is possible to recognize a surrounding object in an area that is not sensed by the radar.

When the radar tracking information and/or the camera tracking information is generated, the tracking information receiver unit 104 receives information generated from the radar unit 100 and/or the camera unit 102.

The approach determination unit 106 receives the radar tracking information and/or the camera tracking information from the tracking information receiver unit 104. Based on the received tracking information, the approach determination unit 106 determines whether the surrounding object approaches the vehicle within a preset distance. When both the radar tracking information and the camera tracking information are received, the approach determination unit 106 may determine whether the surrounding object approaches the vehicle, preferentially using the camera tracking information.

When the approach determination unit 106 determines that the surrounding object approaches the vehicle within a preset distance, the radar determination unit 108 determines whether the radar tracking information is generated in real time. Since the surrounding object may stop or may not enter a collision risk zone after it is determined that the surrounding object approaches within a preset distance, the radar determination unit 108 determines whether the radar tracking information continues in real time. When the approach determination unit 106 determines that the surrounding object approaches within a preset distance, the radar unit 100 and the camera unit 102 detect whether there is another surrounding object. When another surrounding object is detected, tracking information about another detected surrounding object is generated.

After the radar determination unit 108 determines whether the radar tracking information is generated in real time, the camera determination unit 110 determines whether the camera tracking information is generated in real time. The camera has a wide detection range but a short detection distance. Since the camera does not detect the surrounding object that moves at high speed from a distance, there is a high risk of collision between the vehicle and the surrounding object approaching the vehicle from a distance in the case of using the camera. However, since the camera has a wider detection area than that of the radar and may collect the accurate image of the surrounding object, it is possible to know whether there is a surrounding object in the area that is not detected by the radar.

Further, in the case of the surrounding object moving at high speed in the vicinity of the vehicle, the surrounding object may have already passed a zone where there is the risk of collision with the vehicle. In this case, the camera having the wide detection range may determine more clearly than the radar whether a surrounding object is actually present around the vehicle. Thus, after the determination of the radar determination unit 108, the camera determination unit 110 may further determine to supplement the function of BCA.

When it is determined that the radar tracking information and the camera tracking information are generated in real time, the tracking information receiver unit 104 transmit the radar tracking information and the camera tracking information to the control unit 112. When the radar tracking information is generated in real time but the camera tracking information is not generated in real time, the tracking information receiver unit 104 deletes the previously received tracking information. To be more specific, the tracking information receiver unit 104 deletes all the tracking information that has been received so far, thus preventing the BCA from erroneously controlling the vehicle based on the previously received tracking information. However, the tracking information receiver unit may be set to delete not all of data but a certain amount of data, for example, to delete data accumulated for 3 seconds. When the camera determination unit 110 determines that the radar tracking information is not generated in real time but the camera tracking information is generated in real time, the tracking information receiver unit 104 transmits the camera tracking information to the control unit 112.

The control unit 112 receives the radar tracking information and/or the camera tracking information from the tracking information receiver unit 104, and controls a braking system of the vehicle based on the received tracking information. For instance, when there is a risk of colliding with a vehicle approaching from a rear side in the process of taking out a vehicle from a parallel-parking state, the control unit 112 controls the braking system of the vehicle using the BCA.

The control unit 112 may include a collision risk determination unit 113. The collision risk determination unit 113 determines whether there is a risk of collision between the vehicle and the surrounding object based on at least one of tracking information received by the control unit 112. The collision risk determination unit 113 may receive information (hereinafter referred to as "ego-car information") related to the position, speed, and steering angle of the vehicle from the vehicle. In consideration of all or some of the received ego-car information and at least one of tracking information, the collision risk determination unit 113 may determine whether there is a risk of collision between the vehicle and the surrounding object. As a method of receiving the ego-car information from the vehicle, a Controller Area Network (CAN) communication system is typically used. The CAN is a standard specification designed to allow microcontrollers or devices to communicate with each other without a host computer in the vehicle. However, the communication system is not limited to the CAN communication system, but any protocol may be used as long as it is used for communication between electronic devices mounted on the vehicle. For example, Local Interconnect Network (LIN) communication is communication between an actuator and smart sensors in an automobile network.

The warning unit 114 notifies the driver of the vehicle of the start of collision risk warning and braking control. In order to perform warning or notification, a display, a haptic device, an acoustic device, etc. are used. A method of using the display generates a visual output to provide visual information to a driver or a passenger. The display mounted on the vehicle includes a Center Infotainment Display (CID), a cluster, a Rear Seat Entertainment (RSE), a Head Up Display (HUD), etc. The CID communicates with navigation, mobile and audio systems to provide vehicle driving information and entertainment. The cluster provides information that may be desired (or, in some instances, required) for driving, such as the driving speed, RPM, fuel amount, collision warning of the vehicle. The RSE is a display that is mainly used for entertainment activities for a passenger sitting in a rear seat of the vehicle, and also provides the driving state of the vehicle or navigation information. The HUD projects the current speed of the vehicle, a remaining fuel amount, and navigation information in the form of a graphic image on a windshield. However, the display is not limited thereto, and may use any device as long as it may provide the visual information to the driver or the passenger.

Figure 2:
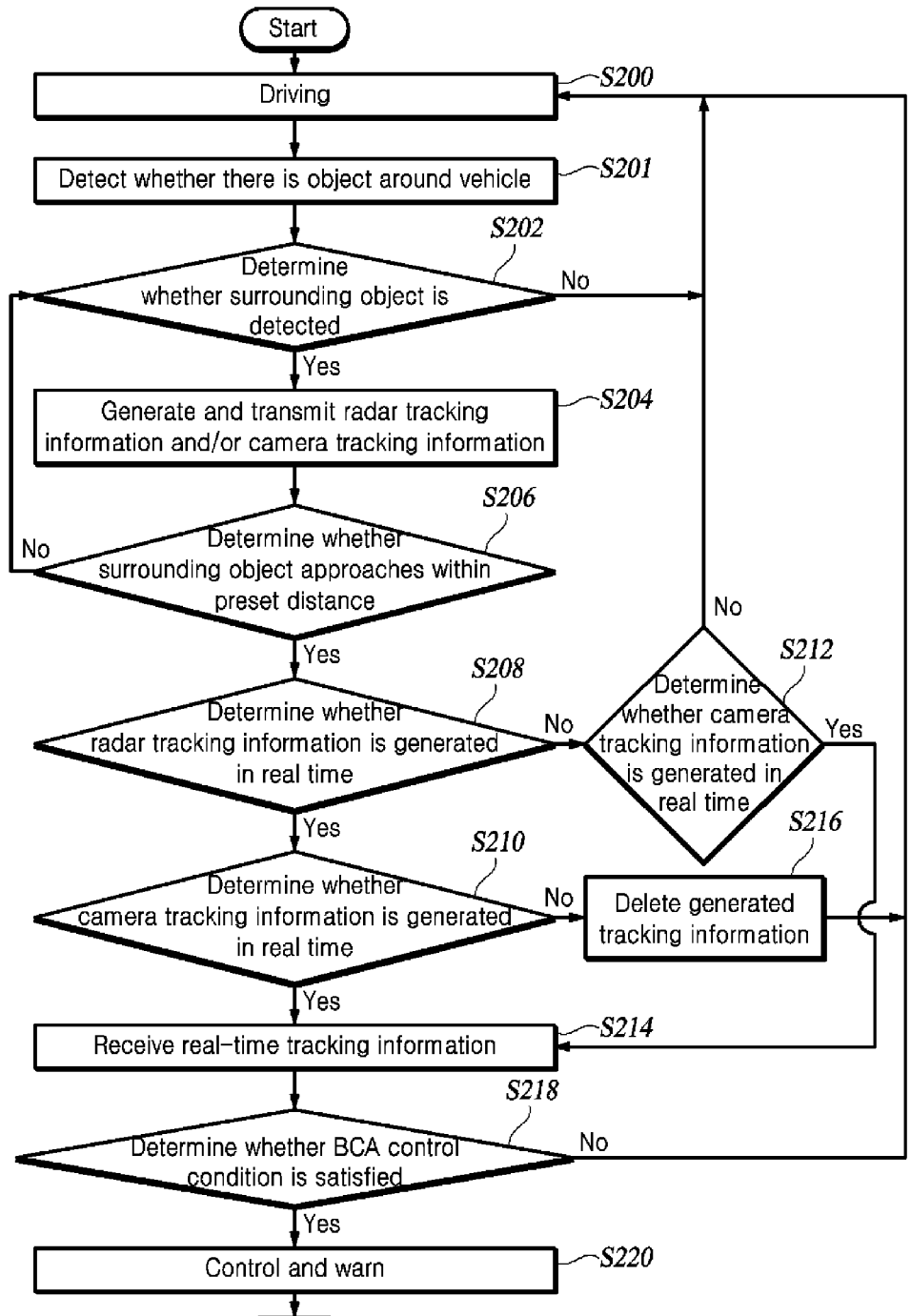
FIG. 2 is a flowchart of a control assistance method according to an embodiment of the present disclosure.

FIG. 2 is a flowchart of a control assistance method according to an embodiment of the present disclosure.

Referring to FIG. 2, when the vehicle starts driving (S200), at least one radar and/or camera detects whether there is an object around the vehicle (S201). After receiving a signal related to the surrounding object detection, the radar determination unit 108 and the camera determination unit 110 determine whether the surrounding object is present (S202).

When the surrounding object is detected by at least one radar and/or camera, the radar unit 100 and/or the camera unit 102 generate the radar tracking information and/or the camera tracking information, respectively. After the tracking information receiver unit 104 receives the generated tracking information from the radar unit 100 and/or the camera unit 102, the information is transmitted to the approach determination unit 106 (S204).

Based on the received tracking information, the approach determination unit 106 determines whether the surrounding object approaches within a preset distance (S206). When the approach determination unit 106 determines that the surrounding object does not approach within a preset distance, the radar unit 100 and/or the camera unit 102 detects another surrounding object.

When the approach determination unit 106 determines that the surrounding object approaches within a preset distance, the radar determination unit 108 determines whether the radar tracking information is generated in real time (S208).

When the radar determination unit 108 determines that the radar tracking information is generated in real time, the camera determination unit 110 determines whether the camera tracking information is generated in real time (S210).

When it is determined that the radar tracking information is not generated in real time, the camera determination unit 110 determines whether the camera tracking information is generated in real time (S212).

When it is determined that both the radar tracking information and the camera tracking information are generated in real time, the control unit 112 receives real-time radar tracking information and real-time camera tracking information from the tracking information receiver unit 104. When it is determined that the radar tracking information is not generated in real time but the camera tracking information is generated in real time, the control unit 112 receives the real-time camera tracking information from the tracking information receiver unit 104 (S214). When it is determined that the radar tracking information is generated in real time but the camera tracking information is not generated in real time, the tracking information receiver unit 104 deletes at least one of the received tracking information (S216).

Based on the received tracking information, the control unit 112 determines whether there is a risk of collision between the vehicle and the surrounding object or whether a BCA control condition is satisfied (S218). When it is determined that the BCA control condition is not satisfied, a process returns to step S200.

When it is determined that there is a risk of collision between the vehicle and the surrounding object, the control unit 112 controls the braking system of the vehicle. When the control unit 112 controls the braking system of the vehicle, the warning unit 114 notifies the driver of the vehicle of the start of collision risk warning and control (S220).

Figure 3A:
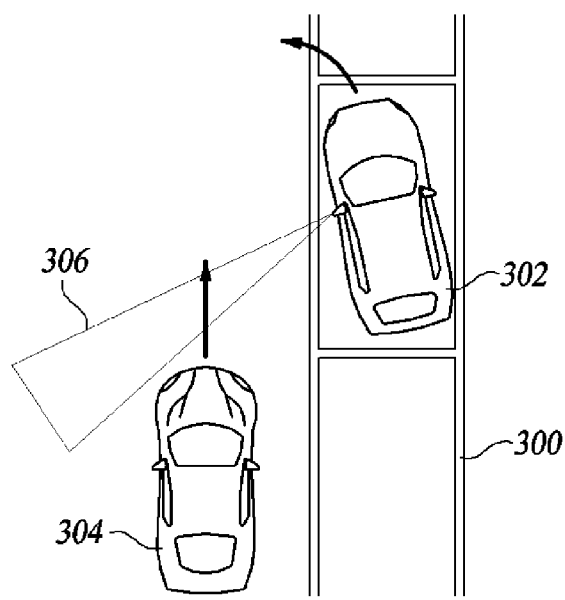
FIG. 3A and FIG. 3B are diagrams in which the control assistance device uses a camera to prevent the non-operation of BCA according to an embodiment of the present disclosure.
Figure 3B:
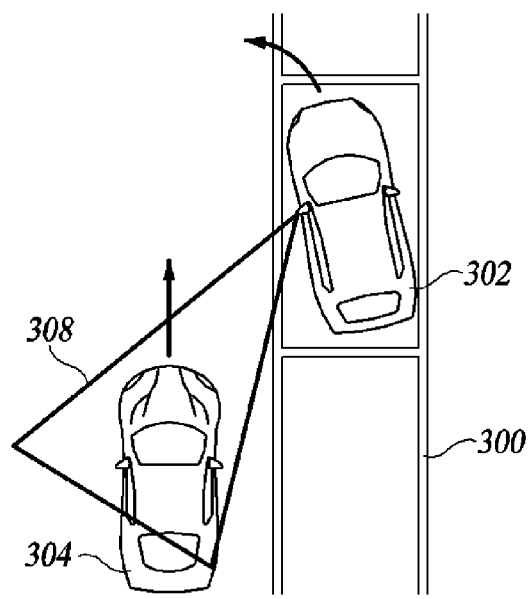

FIG. 3A and FIG. 3B are diagrams in which the control assistance device uses a camera to prevent the non-operation of BCA according to an embodiment of the present disclosure.

Referring to FIG. 3A, when a surrounding vehicle 304 moves at low speed, the radar unit 100 does not generate the radar tracking information because the surrounding vehicle 304 is not included in a radar detection area 306. In this case, referring to FIG. 3B, the control assistance device 10 may detect a wider area as compared to the radar, using the camera. When the surrounding vehicle 304 is included in the camera detection area 308, the camera unit 102 may generate the camera tracking information.

Figure 4A:
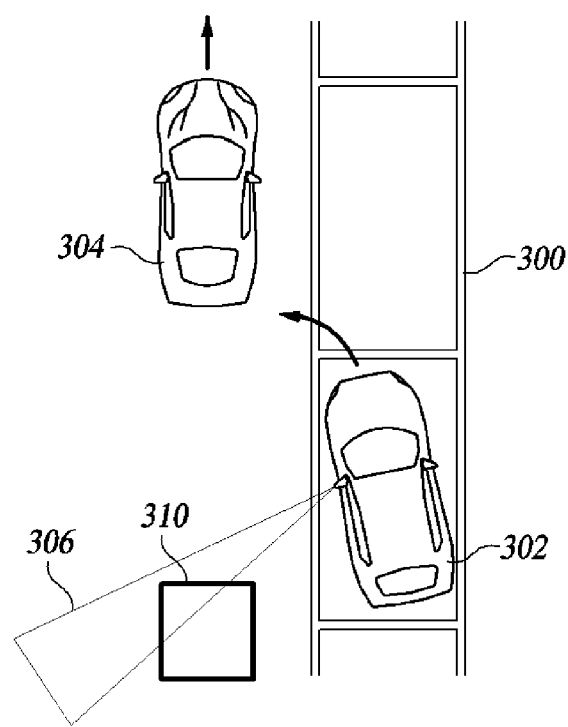
FIG. 4A and FIG. 4B are diagrams in which the control assistance device uses the camera to prevent the malfunction of the BCA according to an embodiment of the present disclosure.
Figure 4B:
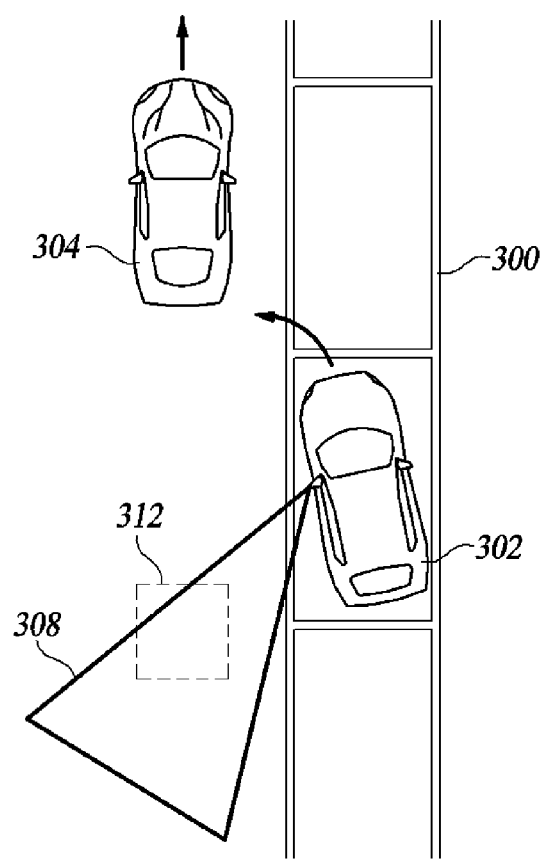

FIG. 4A and FIG. 4B are diagrams in which the control assistance device uses the camera to prevent the malfunction of the BCA according to an embodiment of the present disclosure.

Referring to FIG. 4A, when the surrounding vehicle 304 does not approach within a preset distance, the BCA may erroneously control the braking system of the vehicle based on the previously generated radar tracking information 310. In this case, referring to FIG. 4B, when the control assistance device 10 does not recognize the surrounding vehicle 304 in real time even using the camera, the control assistance device 10 may delete all or some of the previously generated radar tracking information 310, thus preventing the BCA from malfunctioning the vehicle based on the previously generated tracking information.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

A storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

While respective operations are described as being performed by different components, other examples exist where the at least one of the generating of the radar tracking or the camera tracking are performed by one or more processors, which may also be configured to perform operations to determine whether the radar tracking information is generated in real time, when the surrounding object is determined to be approaching within a preset distance from the vehicle based on generated tracking information that includes one or more of the radar tracking information and the camera tracking information, determine whether the camera tracking information is generated in real time, when the surrounding object is determined to be approaching within a preset distance from the vehicle based on generated tracking information that includes at least one of the radar tracking information or the camera tracking information, and determine whether the camera tracking information is generated in real time, when a result of the determining of whether the radar tracking information is generated in real time is that the radar tracking information is generated in real time, by respective one or more processors, in various combinations of the operations by respectively different one or more processors, or collectively by one or more processors. Further, at least one of the one or processors may also be a controller of the vehicle that control a braking system of the vehicle based on the generated tracking information, when a result of the determining of whether the camera tracking information is generated in real time is that the camera tracking information is generated in real time.

While respective operations are described as being performed by different components, other examples exist where outside of the receiving of radar signals, e.g., using an example radar antenna, and the capturing of image information by a camera, remaining operations may be performed by one or more processors, e.g., executing instructions stored in a memory, which when executed configure the one or more processors to perform detecting a surrounding object using one or more radar signals, generating tracking information by performing at least one of generating radar tracking information, of the generated tracking information, tracking a position of a surrounding object, relative to a vehicle, detected based on one or more radar signals received by a radar system, generating camera tracking information, of the generated tracking information, tracking the position of the surrounding object relative to the vehicle, using one or more cameras, determining whether the surrounding object approaches within a preset distance from the vehicle, based on the generated tracking information, determining whether the radar tracking information is generated in real time, when the radar tracking information is generated and when a result of the determining of whether the surrounding object approaches within the preset distance is that the surrounding object approaches within the preset distance, determining whether the camera tracking information is generated in real time, when the camera tracking information is generated and when a result of the determining of whether the radar tracking information is generated in real time is that the radar tracking information is generated in real time, and controlling a braking system of the vehicle based on the generated tracking information, when a result of the determining of whether the camera tracking information is generated in real time is that the camera tracking information is generated in real time, by respective one or more processors, in various combinations of the operations by respectively different one or more processors, or collectively by one or more processors.

While respective operations are described as being performed by different components, other examples exist where one or more processors perform selective control of a braking system of the vehicle, including a selection to control the braking system based on the generated tracking information, when a result of the determining of whether the camera tracking information is generated in real time is that the camera tracking information is generated in real time.

While respective operations are described as being performed by different components, other examples exist where one or more processors control a braking system of the vehicle based on tracking information that includes at least one of radar tracking information or camera tracking information, when the surrounding object is determined to be approaching within a preset distance from the vehicle, the radar tracking information is determined to be generated in real time, and the camera tracking information is determined to be generated in real time, and where the radar tracking information is based on the one or more radar signals and tracks a position of the surrounding object relative to the vehicle, and the camera tracking information is based on the at least image information and tracks the position of the surrounding object relative to the vehicle.

While respective operations are described as being performed by different components, other examples exist where one or more processors to selectively control a braking system of the vehicle, including selecting to control the braking system when the surrounding object is determined to be approaching within a preset distance from the vehicle, the radar tracking information is determined to be generated in real time, and the camera tracking information is determined to be generated in real time, and where the radar tracking information is based on the one or more radar signals and tracks a position of the surrounding object relative to the vehicle, and the camera tracking information is based on the at least image information and tracks the position of the surrounding object relative to the vehicle.

The present disclosure solves problems in the related art, and the present disclosure provides a control assistance device that can detect a surrounding object moving at a low speed or being stopped by using a camera. Accordingly, there is an effect that the control assistance device can operate the BCA by recognizing the surround object that the radar has not detected.

The present disclosure provides a control assistance device that can delete tracking information on the surrounding object when the surrounding object is not recognized using the camera. Accordingly, to the control assistance device prevents the problem of the control assistance device malfunctioning the BCA based on the pre-generated tracking information even though the surrounding object deviated from the collision risk area.

In an example, a control assistance device may be prevented from operating BCA when a surrounding object is not recognized using a camera.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A control assistance device comprising:
   a radar system, including at least a radar receiver configured to receive one or more radar signals, configured to detect a surrounding object based on the one or more radar signals, and generate radar tracking information tracking a position of the surrounding object relative to a vehicle;
   a camera system, including one or more cameras, configured to generate at least image information, and to generate camera tracking information tracking the position of the surrounding object relative to the vehicle based on the at least image information;
   one or more processors configured to:
      determine whether the radar tracking information is generated in real time, when the surrounding object is determined to be approaching within a preset distance from the vehicle based on generated tracking information that includes at least one of the radar tracking information or the camera tracking information;
      determine whether the camera tracking information is generated in real time, when a result of the determining of whether the radar tracking information is generated in real time is that the radar tracking information is generated in real time; and control a braking system of the vehicle based on the generated tracking information, when a result of the determining of whether the camera tracking information is generated in real time is that the camera tracking information is generated in real time.

2. The control assistance device of claim 1, wherein the one or more processors are further configured to perform the determining of whether the surrounding object is approaching within the preset distance from the vehicle.

3. The control assistance device of claim 1, wherein the one or more processors are further configured to perform at least one of the determining of whether radar tracking information is generated in real time, or the determining of whether the camera tracking information is generated in real time.

4. The control assistance device of claim 1, wherein the one or more processors are further configured to:
delete the at least one of the radar tracking information or the camera tracking information from the generated tracking information
in response to a determination that the radar tracking information is generated in real time, and
in response to a determination that the camera tracking information is not generated in real time.

5. The control assistance device of claim 1, wherein at least one processor of the one or more processors is a controller of the vehicle configured to:
receive the camera tracking information and control the braking system of the vehicle based on the camera tracking information when
the result of the determining of whether the radar tracking information is generated in real time is that the radar tracking information is not generated in real time, and
the result of the determining of whether the camera tracking information is generated in real time is that the camera tracking information is generated in real time.

6. The control assistance device of claim 1, wherein, the one or more processors are further configured to determine whether to approach the vehicle, using the camera tracking information when the generated tracking information includes the radar tracking information and the camera tracking information.

7. The control assistance device of claim 1, wherein at least one processor of the one or more processors is a controller, of the vehicle, that comprises a collision risk determination system that is configured to receive ego-car information including at least one of a position, speed, and steering angle of the vehicle from the vehicle, and determine whether there is a risk of collision between the vehicle and the surrounding object, based on the generated tracking information and the ego-car information.

8. The control assistance device of claim 1, further comprising:
a warning system configured to notify a driver of the vehicle of collision risk warning and of braking control, when the braking system of the vehicle is controlled.

9. A control assistance method comprising:
detecting a surrounding object using one or more radar signals;
generating tracking information by performing at least one of:
generating radar tracking information, of the generated tracking information, tracking a position of a surrounding object, relative to a vehicle, detected based on one or more radar signals received by a radar system; and
generating camera tracking information, of the generated tracking information, tracking the position of the surrounding object relative to the vehicle, using one or more cameras;
determining whether the surrounding object approaches within a preset distance from the vehicle, based on the generated tracking information;
determining whether the radar tracking information is generated in real time, when the radar tracking information is generated and when a result of the determining of whether the surrounding object approaches within the preset distance is that the surrounding object approaches within the preset distance;
determining whether the camera tracking information is generated in real time, when the camera tracking information is generated and when a result of the determining of whether the radar tracking information is generated in real time is that the radar tracking information is generated in real time; and
controlling a braking system of the vehicle based on the generated tracking information, when a result of the determining of whether the camera tracking information is generated in real time is that the camera tracking information is generated in real time.

10. The control assistance method of claim 9, wherein the generated tracking information includes the radar tracking information and the camera tracking information, and
wherein the method further comprises deleting at least one of the radar tracking information or the camera tracking information from the generated tracking information, when the result of the determining of whether the radar tracking information is generated in real time is that the radar tracking information is generated in real time, and the result of the determining of whether the camera tracking information is generated in real time is that the camera tracking information is not generated in real time.

11. The control assistance method of claim 9, wherein the controlling of the braking system further comprises controlling the braking system of the vehicle based on the camera tracking information when the result of the determining of whether the radar tracking information is generated in real time is that the radar tracking information is not generated in real time, and the result of the determining of whether the camera tracking information is generated in real time is that the camera tracking information is generated in real time.

12. The control assistance method of claim 9, wherein the determining of whether the surrounding object approaches within the preset distance includes determining whether to approach the vehicle, using the camera tracking information, when the generated tracking information includes the radar tracking information and the camera tracking information.

13. The control assistance method of claim 9, wherein the controlling of the braking system further comprises receiving ego-car information including at least one of a position, speed, and steering angle of the vehicle from the vehicle, and determining whether there is a risk of collision between the vehicle and the surrounding object, based on the generated tracking information and the ego-car information.

14. The control assistance method of claim 9, further comprising:
a process of notifying a driver of the vehicle of collision risk warning and of braking control, in the case of the controlling the braking system of the vehicle.

15. A control assistance device comprising:
a radar system including at least a radar receiver configured to receive one or more radar signals, for detecting a surrounding object based on the one or more radar signals;
a camera system, including one or more cameras, configured to generate at least image information, for tracking the surrounding object based on the at least image information; and
one or more processors configured to control a braking system of the vehicle based on tracking information that includes at least one of radar tracking information or camera tracking information, when the surrounding object is determined to be approaching within a preset distance from the vehicle, the radar tracking information is determined to be generated in real time, and the camera tracking information is determined to be generated in real time,
wherein the radar tracking information is based on the one or more radar signals and tracks a position of the surrounding object relative to the vehicle, and
wherein the camera tracking information is based on the at least image information and tracks the position of the surrounding object relative to the vehicle.

16. The control assistance device of claim 15,
wherein the radar system is configured to detect the surrounding object and generate the radar tracking information, and
wherein the camera system is configured to generate the camera tracking information.

17. The control assistance device of claim 15, wherein the one or more processors are further configured to perform the determining of whether the surrounding object is approaching within the preset distance from the vehicle based on the tracking information.

18. The control assistance device of claim 15, wherein the one or more processors are further configured to perform at least one of the determining of whether radar tracking information is generated in real time, or the determining of whether the camera tracking information is generated in real time.

* * * * *